M. J. SHIMER.
Locking Devices for Slide-Rests.
No. 158,747. Patented Jan. 12, 1875.
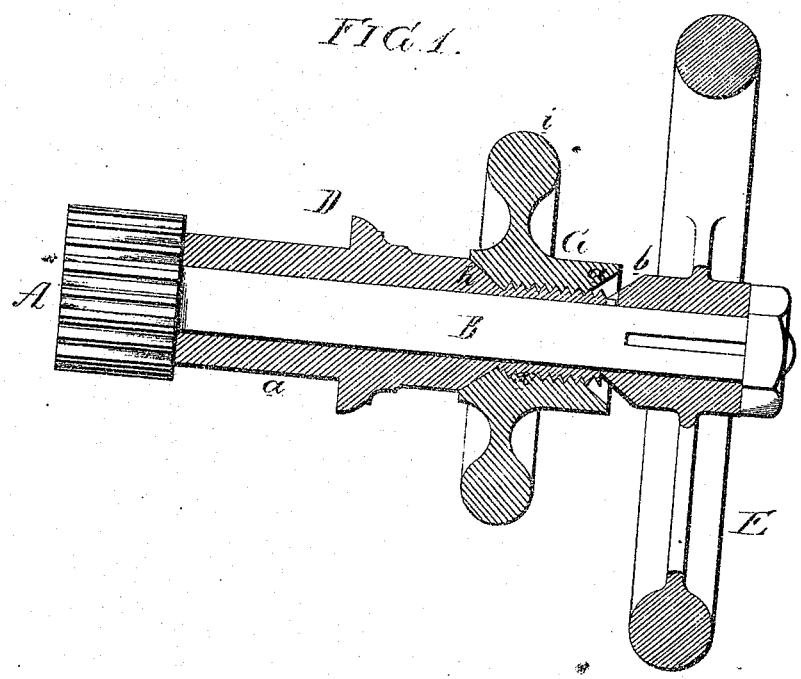
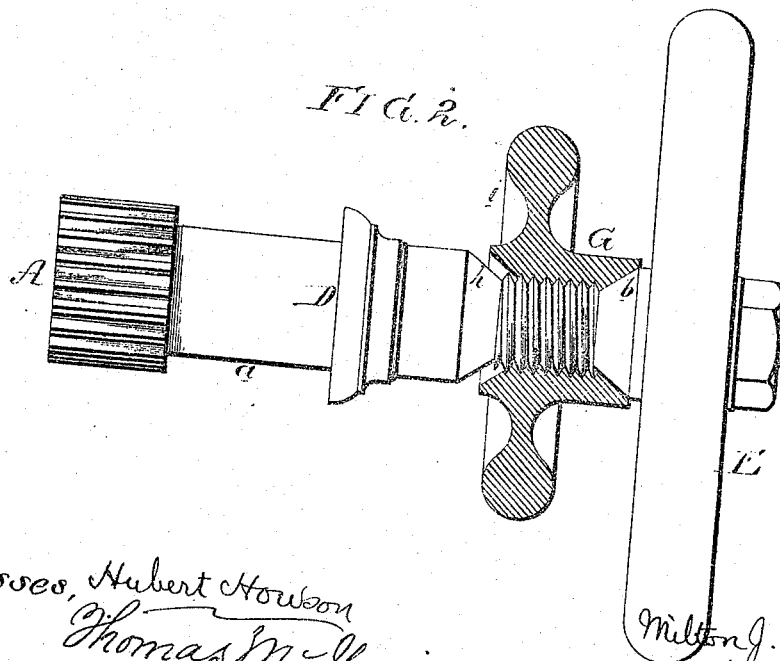

UNITED STATES PATENT OFFICE.

MILTON J. SHIMER, OF CAMDEN, NEW JERSEY.

IMPROVEMENT IN LOCKING DEVICES FOR SLIDE-RESTS.

Specification forming part of Letters Patent No. 158,747, dated January 12, 1875; application filed November 11, 1874.

*To all whom it may concern:*

Be it known that I, MILTON J. SHIMER, of Camden, Camden county, New Jersey, have invented a Device for Locking and Unlocking the Slide-Rest of Lathes, of which the following is a specification:

The object of my invention is to readily lock a slide-rest when its secure attachment to the bed of the lathe is essential to the proper action of the cutter, and to readily unlock the slide-rest when it has to be traversed along the bed of the lathe; and this object I attain in the manner illustrated in the accompanying drawing, in which B is a spindle adapted to a bearing, D, secured to or forming part of the slide-rest of a lathe. To one end of this spindle is secured a hand-wheel, E, and to the opposite end a pinion, A, on turning which the slide-rest is caused, through the medium of intermediate gearing, to traverse the bed of the lathe in a manner too well known to need description. On the hub of the wheel is formed a cone, b, corresponding with a conical recess, e, in one end of a nut, G, which is adapted to the threaded portion x of the bearing D, and on the latter is formed a cone, h, adapted to a conical recess in the other end of the nut. In order to afford facilities for manipulating this nut, it forms part of a hand-wheel, i, the periphery of which I prefer to serrate. As shown in Fig. 1, the nut G has been screwed tight against the bearing h, so that it cannot by accident come into contact with the hub of the hand-wheel E, and when the nut has been thus disposed of the shaft B is at liberty to be turned by manipulating the hand-wheel, and the slide-rest can, consequently, be traversed to any desired position on the bed of the lathe; but on screwing the nut G back until it is in tight frictional contact with the hub of the hand-wheel, the shaft B will be locked to its bearing, and the slide-rest will consequently be locked to the bed of the lathe.

The advantages of my invention will be best understood by supposing that it is necessary to make on the object on the lathe a cut at right angles to the bed by a transverse feed of the slide-rest. Under such circumstances a pressure is exerted on the cutter which tends to move the slide-rest along the bed, and the point of the cutter must, consequently, deviate from the intended course. This is effectually prevented by my invention, which affords ready facilities for so locking the slide-rest that the point of the cutter must pursue the course intended, and for readily unlocking the rest when it becomes necessary to traverse the same on the bed of the lathe.

It is not essential that there should be a conical bearing, h, to screw the nut G against, nor is it necessary that a cone, b, should be formed on the hub of the wheel for receiving the countersunk end of the nut; but I prefer the cone, as it insures a determined frictional contact of the nut with the hub of the wheel.

I claim as my invention—

The combination of the spindle B, for traversing the slide-rest of the lathe, the bearing D of the spindle, and the hand-wheel E, secured to the spindle B, with a nut, G, adapted to the said bearing and to the hub of the wheel, all substantially as set forth.

In testimony whereof I have signed my name to this specification in the presence of two subscribing witnesses.

MILTON J. SHIMER.

Witnesses:
 HARRY SMITH,
 HUBERT HOWSON.